US012236961B2

(12) United States Patent
Samuelsson et al.

(10) Patent No.: US 12,236,961 B2
(45) **Date of Patent: *Feb. 25, 2025**

(54) AUDIO ENCODER AND DECODER

(71) Applicant: DOLBY INTERNATIONAL AB, Dublin (IE)

(72) Inventors: Leif Jonas Samuelsson, Sundbyberg (SE); Heiko Purnhagen, Sundbyberg (SE)

(73) Assignee: DOLBY INTERNATIONAL AB, Amsterdam Zuidoost (NL)

( * ) Notice: Subject to any disclaimer, the term of this patent is extended or adjusted under 35 U.S.C. 154(b) by 0 days.

This patent is subject to a terminal disclaimer.

(21) Appl. No.: 18/114,885

(22) Filed: Feb. 27, 2023

(65) Prior Publication Data

US 2023/0282219 A1 Sep. 7, 2023

Related U.S. Application Data

(60) Continuation of application No. 17/333,527, filed on May 28, 2021, now Pat. No. 11,594,233, which is a (Continued)

(51) Int. Cl.
*G10L 19/008* (2013.01)
*G10L 19/00* (2013.01)
(Continued)

(52) U.S. Cl.
CPC ........ *G10L 19/008* (2013.01); *G10L 19/0017* (2013.01); *G10L 19/038* (2013.01);
(Continued)

(58) Field of Classification Search
CPC ... G10L 19/008; G10L 19/0017; G10L 19/00; G10L 19/038; G10L 19/032; H04S 3/02;
(Continued)

(56) References Cited

U.S. PATENT DOCUMENTS 7,663,513 B2 2/2010 Pang
7,953,595 B2 5/2011 Xie
(Continued)

FOREIGN PATENT DOCUMENTS

CN 1476673 A 2/2004
CN 101695132 A 4/2010
(Continued)

OTHER PUBLICATIONS

Hotho, G. et al "Multichannel Coding of Applause Signals" EURASIP Journal on Advances in Signal Processing, vol. 55, No. 10, Jan. 1, 2008, pp. 1-9.

(Continued)

*Primary Examiner* — Ahmad F. Matar
*Assistant Examiner* — Sabrina Diaz
(74) *Attorney, Agent, or Firm* — Fountainhead Law Group, PC

(57) ABSTRACT

The present disclosure provides methods, devices and computer program products for encoding and decoding of a vector of parameters in an audio coding system. The disclosure further relates to a method and apparatus for reconstructing an audio object in an audio decoding system. According to the disclosure, a modulo differential approach for coding and encoding a vector of a non-periodic quantity may improve the coding efficiency and provide encoders and decoders with less memory requirements. Moreover, an efficient method for encoding and decoding a sparse matrix is provided.

20 Claims, 7 Drawing Sheets

Related U.S. Application Data continuation of application No. 16/925,898, filed on Jul. 10, 2020, now Pat. No. 11,024,320, which is a continuation of application No. 16/573,488, filed on Sep. 17, 2019, now Pat. No. 10,714,104, which is a continuation of application No. 15/946,529, filed on Apr. 5, 2018, now Pat. No. 10,418,038, which is a division of application No. 15/643,416, filed on Jul. 6, 2017, now Pat. No. 9,940,939, which is a division of application No. 14/892,722, filed as application No. PCT/EP2014/060731 on May 23, 2014, now Pat. No. 9,704,493.

(60) Provisional application No. 61/827,264, filed on May 24, 2013.

(51) Int. Cl.
*G10L 19/038* (2013.01)
*H04S 3/02* (2006.01)
*G10L 19/032* (2013.01)

(52) U.S. Cl.
CPC .............. *H04S 3/02* (2013.01); *G10L 19/032* (2013.01); *H04S 2400/01* (2013.01); *H04S 2420/03* (2013.01)

(58) Field of Classification Search
CPC .... H04S 3/00; H04S 2400/01; H04S 2420/03; H04S 5/005; H04R 2430/00; H04H 20/88; H04H 20/89
USPC ............................................... 381/20, 22, 23
See application file for complete search history.

(56) References Cited

U.S. PATENT DOCUMENTS

| | | | | |
|---|---|---|---|---|
| 8,194,862 | B2 | 6/2012 | Herr | |
| 8,271,274 | B2 | 9/2012 | Massaloux | |
| 8,315,880 | B2 | 11/2012 | Kovesi | |
| 8,332,213 | B2 | 12/2012 | Gournay | |
| 9,940,939 | B2 * | 4/2018 | Samuelsson | G10L 19/0017 |
| 10,418,038 | B2 * | 9/2019 | Samuelsson | G10L 19/038 |
| 11,024,320 | B2 * | 6/2021 | Samuelsson | G10L 19/038 |
| 11,594,233 | B2 * | 2/2023 | Samuelsson | G10L 19/008 |
| 2004/0039568 | A1 | 2/2004 | Toyama | |
| 2004/0268334 | A1 | 12/2004 | Muthukumar | |
| 2005/0053242 | A1 | 3/2005 | Henn et al. | |
| 2006/0080090 | A1 | 4/2006 | Ramo | |
| 2007/0055510 | A1 | 3/2007 | Hilpert et al. | |
| 2007/0078646 | A1 | 4/2007 | Lei | |
| 2008/0097749 | A1 | 4/2008 | Xie | |
| 2009/0030678 | A1 | 1/2009 | Kovesi et al. | |
| 2009/0222272 | A1 | 9/2009 | Seefeldt | |
| 2011/0022402 | A1 | 1/2011 | Engdegard et al. | |
| 2011/0148901 | A1 | 6/2011 | Adams | |
| 2012/0039414 | A1 | 2/2012 | Fang | |
| 2012/0128165 | A1 * | 5/2012 | Visser | G10L 19/008 381/56 |
| 2012/0213379 | A1 * | 8/2012 | Kim | H04B 1/665 381/22 |
| 2012/0323568 | A1 | 12/2012 | Bruhn | |
| 2013/0013321 | A1 | 1/2013 | Oh | |
| 2013/0030817 | A1 | 1/2013 | Purnhagen | |
| 2015/0142453 | A1 * | 5/2015 | Oomen | G10L 19/265 704/500 |

FOREIGN PATENT DOCUMENTS

| | | | |
|---|---|---|---|
| EP | 1345331 | | 9/2003 |
| JP | 2003-110429 | | 4/2003 |
| JP | 2003-284023 | | 10/2003 |
| JP | 2007520948 | A | 7/2007 |
| JP | 2010-501089 | | 1/2010 |
| JP | 2011-527451 | | 10/2011 |
| JP | 2012-505423 | | 3/2012 |
| JP | 2012-141633 | | 7/2012 |
| JP | 6105159 | A | 9/2016 |
| JP | 6105159 | | 3/2017 |
| JP | 6920382 | B2 | 8/2021 |
| KR | 10-1763131 | | 7/2017 |
| RU | 2376654 | C2 | 12/2009 |
| RU | 2010138572 | | 3/2012 |
| UA | 48138 | | 3/2010 |
| WO | 2010/086216 | | 8/2010 |
| WO | 2011049416 | A2 | 4/2011 |
| WO | 2011128138 | A1 | 10/2011 |
| WO | 2011/142566 | | 11/2011 |
| WO | 2012/058229 | | 5/2012 |
| WO | 2012/144127 | | 10/2012 |
| WO | 2013/064957 | | 5/2013 |

OTHER PUBLICATIONS

Liu, Bin-Bin, et al "A Novel Lattice Vector Quantization Utilizing Division Table Extension" Shanghai Jiaotong Daxue Xuebao/ Journal of Shanghai Jiaotong University, v. 43, No. 7, pp. 1085-1089, Jul. 2009.

Mebel, O. "A Fast Geometric Method for Blind Separation of Sparse Sources" IEEE 25th Convention of Electrical and Electronics Engineers in Israel, Dec. 3-5, 2008, pp. 180-184.

Seung, J.L et al "An Efficient Huffman Table Sharing Method for Memory-Constrained Entropy Coding of Multiple Sources" Signal Processing, Image Communication, vol. 13, No. 2, Aug. 1, 1998.

* cited by examiner

AUDIO ENCODER AND DECODER

CROSS-REFERENCE TO RELATED APPLICATIONS

This application is a continuation of U.S. patent application Ser. No. 17/333,527 filed May 28, 2021, which is a continuation of U.S. patent application Ser. No. 16/925,898 filed on Jul. 10, 2020 (now U.S. Pat. No. 11,024,320), which is a continuation of U.S. patent application Ser. No. 16/573,488 filed on Sep. 17, 2019 (now U.S. Pat. No. 10,714,104), which is a continuation of U.S. patent application Ser. No. 15/946,529 filed on Apr. 5, 2018 (now U.S. Pat. No. 10,418,038), which is a divisional of U.S. patent application Ser. No. 15/643,416 filed on Jul. 6, 2017 (now U.S. Pat. No. 9,940,939), which is a divisional of U.S. patent application Ser. No. 14/892,722 filed on Nov. 20, 2015 (now U.S. Pat. No. 9,704,493), which is the U.S. National Stage of International Patent Application No. PCT/EP2014/060731 filed May 23, 2014, which claims priority to U.S. Provisional Patent Application No. 61/827,264 filed on May 24, 2013, all of which are hereby incorporated by reference in their entirety.

TECHNICAL FIELD

The disclosure herein generally relates to audio coding. In particular it relates to encoding and decoding of a vector of parameters in an audio coding system. The disclosure further relates to a method and apparatus for reconstructing an audio object in an audio decoding system.

BACKGROUND ART

In conventional audio systems, a channel-based approach is employed. Each channel may for example represent the content of one speaker or one speaker array. Possible coding schemes for such systems include discrete multi-channel coding or parametric coding such as MPEG Surround.

More recently, a new approach has been developed. This approach is object-based. In system employing the object-based approach, a three-dimensional audio scene is represented by audio objects with their associated positional metadata. These audio objects move around in the three-dimensional audio scene during playback of the audio signal. The system may further include so called bed channels, which may be described as stationary audio objects which are directly mapped to the speaker positions of for example a conventional audio system as described above.

A problem that may arise in an object-based audio system is how to efficiently encode and decode the audio signal and preserve the quality of the coded signal. A possible coding scheme includes, on an encoder side, creating a downmix signal comprising a number of channels from the audio objects and bed channels, and side information which enables recreation of the audio objects and bed channels on a decoder side.

MPEG Spatial Audio Object Coding (MPEG SAOC) describes a system for parametric coding of audio objects. The system sends side information, c.f. upmix matrix, describing the properties of the objects by means of parameters such as level difference and cross correlation of the objects. These parameters are then used to control the recreation of the audio objects on a decoder side. This process can be mathematically complex and often has to rely on assumptions about properties of the audio objects that is not explicitly described by the parameters. The method presented in MPEG SAOC may lower the required bitrate for an object-based audio system, but further improvements may be needed to further increase the efficiency and quality as described above.

BRIEF DESCRIPTION OF THE DRAWINGS

Example embodiments will now be described with reference to the accompanying drawings, on which.

All the figures are schematic and generally only show parts which are necessary in order to elucidate the disclosure, whereas other parts may be omitted or merely suggested. Unless otherwise indicated, like reference numerals refer to like parts in different figures.

DETAILED DESCRIPTION

Figure 1:
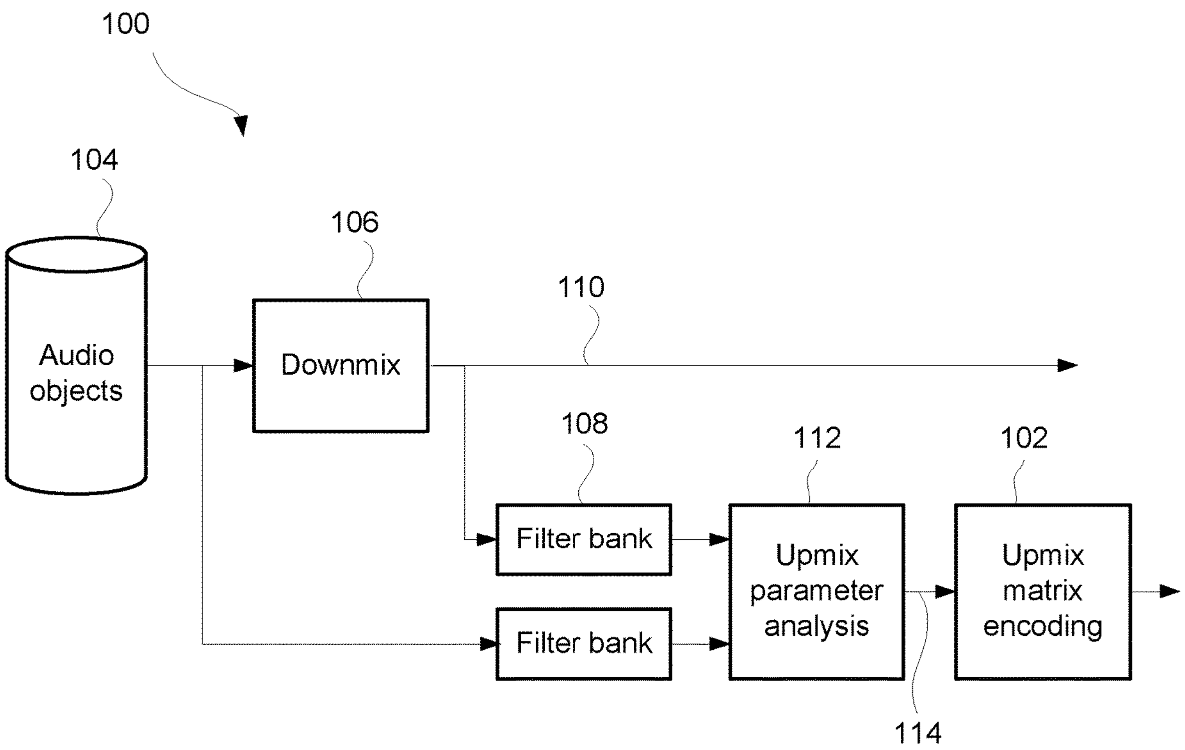
FIG. 1 is a generalized block diagram of an audio encoding system in accordance with an example embodiment.

In view of the above it is an object to provide encoders and decoders and associated methods which provide an increased efficiency and quality of the coded audio signal.

I. Overview—Encoder

According to a first aspect, example embodiments propose encoding methods, encoders, and computer program products for encoding. The proposed methods, encoders and computer program products may generally have the same features and advantages.

According to example embodiments there is provided a method for encoding a vector of parameters in an audio encoding system, each parameter corresponding to a non-periodic quantity, the vector having a first element and at least one second element, the method comprising: representing each parameter in the vector by an index value which may take N values; associating each of the at least one second element with a symbol, the symbol being calculated by: calculating a difference between the index value of the second element and the index value of its preceding element in the vector; applying modulo N to the difference. The method further comprises the step of encoding each of the at least one second element by entropy coding of the symbol associated with the at least one second element based on a probability table comprising probabilities of the symbols.

An advantage of this method is that the number of possible symbols is reduced by approximately a factor of two compared to conventional difference coding strategies where modulo N is not applied to the difference. Consequently the size of the probability table is reduced by approximately a factor of two. As a result, less memory is required to store the probability table and, since the probability table often is stored in expensive memory in the encoder, the encoder may in this way be made cheaper. Moreover, the speed of looking up the symbol in the probability table may be increased. A further advantage is that coding efficiency may increase since all symbols in the probability table are possible candidates to be associated with a specific second element. This can be compared to conventional difference coding strategies where only approximately half of the symbols in the probability table are candidates for being associated with a specific second element.

According to embodiments, the method further comprises associating the first element in the vector with a symbol, the symbol being calculated by: shifting the index value representing the first element in the vector by an off-set value; applying modulo N to the shifted index value. The method further comprises the step of encoding the first element by entropy coding of the symbol associated with the first element using the same probability table that is used to encode the at least one second element.

This embodiment uses the fact that the probability distribution of the index value of the first element and the probability distribution of the symbols of the at least one second element are similar, although being shifted relative to each other by an off-set value. As a consequence, the same probability table may be used for the first element in the vector, instead of a dedicated probability table. This may result in reduced memory requirements and a cheaper encoder according to above.

According to an embodiment, the off-set value is equal to the difference between a most probable index value for the first element and the most probable symbol for the at least one second element in the probability table. This means that the peaks of the probability distributions are aligned. Consequently, substantially the same coding efficiency is maintained for the first element compared to if a dedicated probability table for the first element is used.

According to embodiments, the first element and the at least one second element of the vector of parameters correspond to different frequency bands used in the audio encoding system at a specific time frame. This means that data corresponding to a plurality of frequency bands can be encoded in the same operation. For example, the vector of parameters may correspond to an upmix or reconstruction coefficient which varies over a plurality of frequency bands.

According to an embodiment, the first element and the at least one second element of the vector of parameters correspond to different time frames used in the audio encoding system at a specific frequency band. This means that data corresponding to a plurality of time frames can be encoded in the same operation. For example, the vector of parameters may correspond to an upmix or reconstruction coefficient which varies over a plurality time frames.

According to embodiments, the probability table is translated to a Huffman codebook, wherein the symbol associated with an element in the vector is used as a codebook index, and wherein the step of encoding comprises encoding each of the at least one second element by representing the second element with a codeword in the codebook that is indexed by the codebook index associated with the second element. By using the symbol as a codebook index, the speed of looking up of the codeword to represent the element may be increased.

According to embodiments, the step of encoding comprises encoding the first element in the vector using the same Huffman codebook that is used to encode the at least one second element by representing the first element with a codeword in the Huffman codebook that is indexed by the codebook index associated with the first element. Consequently, only one Huffman codebook needs to be stored in memory of the encoder, which may lead to a cheaper encoder according to above.

According to a further embodiment, the vector of parameters corresponds to an element in an upmix matrix determined by the audio encoding system. This may decrease the required bit rate in an audio encoding/decoding system since the upmix matrix may be efficiently coded.

According to example embodiments there is provided a computer-readable medium comprising computer code instructions adapted to carry out any method of the first aspect when executed on a device having processing capability.

According to example embodiments there is provided an encoder for encoding a vector of parameters in an audio encoding system, each parameter corresponding to a non-periodic quantity, the vector having a first element and at least one second element, the encoder comprising: a receiving component adapted to receive the vector; an indexing component adapted to represent each parameter in the vector by an index value which may take N values; an associating component adapted to associate each of the at least one second element with a symbol, the symbol being calculated by: calculating a difference between the index value of the second element and the index value of its preceding element in the vector; applying modulo N to the difference. The encoder further comprises an encoding component for encoding each of the at least one second element by entropy coding of the symbol associated with the at least one second element based on a probability table comprising probabilities of the symbols.

II. Overview—Decoder

According to a second aspect, example embodiments propose decoding methods, decoders, and computer program products for decoding. The proposed methods, decoders and computer program products may generally have the same features and advantages.

Advantages regarding features and setups as presented in the overview of the encoder above may generally be valid for the corresponding features and setups for the decoder.

According to example embodiments there is provided a method for decoding a vector of entropy coded symbols in an audio decoding system into a vector of parameters relating to a non-periodic quantity, the vector of entropy coded symbols comprising a first entropy coded symbol and at least one second entropy coded symbol and the vector of parameters comprising a first element and at least one second element, the method comprising: representing each entropy coded symbol in the vector of entropy coded symbols by a symbol which may take N integer values by using a probability table; associating the first entropy coded symbol with an index value; associating each of the at least one second entropy coded symbol with an index value, the index value of the at least one second entropy coded symbol being calculated by: calculating the sum of the index value associated with the of entropy coded symbol preceding the second entropy coded symbol in the vector of entropy coded symbols and the symbol representing the second entropy coded symbol; applying modulo N to the sum. The method further comprises the step of representing the at least one second element of the vector of parameters by a parameter value corresponding to the index value associated with the at least one second entropy coded symbol.

According to example embodiments, the step of representing each entropy coded symbol in the vector of entropy coded symbols by a symbol is performed using the same probability table for all entropy coded symbols in the vector of entropy coded symbols, wherein the index value associated with the first entropy coded symbol is calculated by: shifting the symbol representing the first entropy coded symbol in the vector of entropy coded symbols by an off-set value; applying modulo N to the shifted symbol. The method further comprising the step of: representing the first element of the vector of parameters by a parameter value corresponding to the index value associated with the first entropy coded symbol.

According to an embodiment, the probability table is translated to a Huffman codebook and each entropy coded symbol corresponds to a codeword in the Huffman codebook.

According to further embodiments, each codeword in the Huffman codebook is associated with a codebook index, and the step of representing each entropy coded symbol in the vector of entropy coded symbols by a symbol comprises representing the entropy coded symbol by the codebook index being associated with the codeword corresponding to the entropy coded symbol.

According to embodiments, each entropy coded symbol in the vector of entropy coded symbols corresponds to different frequency bands used in the audio decoding system at a specific time frame.

According to an embodiment, each entropy coded symbol in the vector of entropy coded symbols corresponds to different time frames used in the audio decoding system at a specific frequency band.

According to embodiments, the vector of parameters corresponds to an element in an upmix matrix used by the audio decoding system.

According to example embodiments there is provided a computer-readable medium comprising computer code instructions adapted to carry out any method of the second aspect when executed on a device having processing capability.

According to example embodiments there is provided a decoder for decoding a vector of entropy coded symbols in an audio decoding system into a vector of parameters relating to a non-periodic quantity, the vector of entropy coded symbols comprising a first entropy coded symbol and at least one second entropy coded symbol and the vector of parameters comprising a first element and at least a second element, the decoder comprising: a receiving component configured to receive the vector of entropy coded symbols; a indexing component configured to represent each entropy coded symbol in the vector of entropy coded symbols by a symbol which may take N integer values by using a probability table; an associating component configured to associate the first entropy coded symbol with an index value; the associating component further configured to associate each of the at least one second entropy coded symbol with an index value, the index value of the at least one second entropy coded symbol being calculated by: calculating the sum of the index value associated with the entropy coded symbol preceding the second entropy coded symbol in the vector of entropy coded symbols and the symbol representing the second entropy coded symbol; applying modulo N to the sum. The decoder further comprises a decoding component configured to represent the at least one second element of the vector of parameters by a parameter value corresponding to the index value associated with the at least one second entropy coded symbol.

III. Overview—Sparse Matrix Encoder

According to a third aspect, example embodiments propose encoding methods, encoders, and computer program products for encoding. The proposed methods, encoders and computer program products may generally have the same features and advantages.

According to example embodiments there is provided a method for encoding an upmix matrix in an audio encoding system, each row of the upmix matrix comprising M elements allowing reconstruction of a time/frequency tile of an audio object from a downmix signal comprising M channels, the method comprising: for each row in the upmix matrix: selecting a subset of elements from the M elements of the row in the upmix matrix; representing each element in the selected subset of elements by a value and a position in the upmix matrix; encoding the value and the position in the upmix matrix of each element in the selected subset of elements.

As used herein, by the term downmix signal comprising M channels is meant a signal which comprises M signals, or channels, where each of the channels is a combination of a plurality of audio objects, including the audio objects to be reconstructed. The number of channels is typically larger than one and in many cases the number of channels is five or more.

As used herein, the term upmix matrix refers to a matrix having N rows and M columns which allows N audio objects to be reconstructed from a downmix signal comprising M channels. The elements on each row of the upmix matrix corresponds to one audio object, and provide coefficients to be multiplied with the M channels of the downmix in order to reconstruct the audio object.

As used herein, by a position in the upmix matrix is generally meant a row and a column index which indicates the row and the column of the matrix element. The term position may also mean a column index in a given row of the upmix matrix.

In some cases, sending all elements of an upmix matrix per time/frequency tile requires an undesirably high bit rate in an audio encoding/decoding system. An advantage of the method is that only a subset of the upmix matrix elements needs to encoded and transmitted to a decoder. This may decrease the required bit rate of an audio encoding/decoding system since less data is transmitted and the data may be more efficiently coded.

Audio encoding/decoding systems typically divide the time-frequency space into time/frequency tiles, e.g. by applying suitable filter banks to the input audio signals. By a time/frequency tile is generally meant a portion of the time-frequency space corresponding to a time interval and a frequency sub-band. The time interval may typically correspond to the duration of a time frame used in the audio encoding/decoding system. The frequency sub-band may typically correspond to one or several neighboring frequency sub-bands defined by the filter bank used in the encoding/decoding system. In the case the frequency sub-band corresponds to several neighboring frequency sub-bands defined by the filter bank, this allows for having non-uniform frequency sub-bands in the decoding process of the audio signal, for example wider frequency sub-bands for higher frequencies of the audio signal. In a broadband case, where the audio encoding/decoding system operates on the whole frequency range, the frequency sub-band of the time/frequency tile may correspond to the whole frequency range. The above method discloses the encoding steps for encoding an upmix matrix in an audio encoding system for allowing reconstruction of an audio object during one such time/frequency tile. However, it is to be understood that the method may be repeated for each time/frequency tile of the audio encoding/decoding system. Also it is to be understood that several time/frequency tiles may be encoded simultaneously. Typically, neighboring time/frequency tiles may overlap a bit in time and/or frequency. For example, an overlap in time may be equivalent to a linear interpolation of the elements of the reconstruction matrix in time, i.e. from one time interval to the next. However, this disclosure targets other parts of encoding/decoding system and any overlap in time and/or frequency between neighboring time/frequency tiles is left for the skilled person to implement.

According to embodiments, for each row in the upmix matrix, the positions in the upmix matrix of the selected subset of elements vary across a plurality of frequency bands and/or across a plurality of time frames. Accordingly, the selection of the elements may depend on the particular time/frequency tile so that different elements may be selected for different time/frequency tiles. This provides a more flexible encoding method which increases the quality of the coded signal.

According to embodiments, the selected subset of elements comprises the same number of elements for each row of the upmix matrix. In further embodiments, the number of selected elements may be exactly one. This reduces the complexity of the encoder since the algorithm only needs to select the same number of element(s) for each row, i.e. the element(s) which are most important when performing an upmix on a decoder side.

According to embodiments, for each row in the upmix matrix and for a plurality of frequency bands or a plurality of time frames, the values of the elements of the selected subsets of elements form one or more vector of parameters, each parameter in the vector of parameters corresponding to one of the plurality of frequency bands or the plurality of time frames, and wherein the one or more vector of parameters are encoded using the method according to the first aspect. In other words, the values of the selected elements may be efficiently coded. Advantages regarding features and setups as presented in the overview of the first aspect above may generally be valid for this embodiment.

According to embodiments, for each row in the upmix matrix and for a plurality of frequency bands or a plurality of time frames, the positions of the elements of the selected subsets of elements form one or more vector of parameters, each parameter in the vector of parameters corresponding to one of the plurality of frequency bands or plurality of time frames, and wherein the one or more vector of parameters are encoded using the method according to the first aspect. In other words, the positions of the selected elements may be efficiently coded. Advantages regarding features and setups as presented in the overview of the first aspect above may generally be valid for this embodiment.

According to example embodiments there is provided a computer-readable medium comprising computer code instructions adapted to carry out any method of the third aspect when executed on a device having processing capability.

According to example embodiments there is provided an encoder for encoding an upmix matrix in an audio encoding system, each row of the upmix matrix comprising M elements allowing reconstruction of a time/frequency tile of an audio object from a downmix signal comprising M channels, the encoder comprising: a receiving component adapted to receive each row in the upmix matrix; a selection component adapted to select a subset of elements from the M elements of the row in the upmix matrix; an encoding component adapted to represent each element in the selected subset of elements by a value and a position in the upmix matrix, the encoding component further adapted to encode the value and the position in the upmix matrix of each element in the selected subset of elements.

IV. Overview—Sparse Matrix Decoder

According to a fourth aspect, example embodiments propose decoding methods, decoders, and computer program products for decoding. The proposed methods, decoders and computer program products may generally have the same features and advantages.

Advantages regarding features and setups as presented in the overview of the sparse matrix encoder above may generally be valid for the corresponding features and setups for the decoder According to example embodiments there is provided a method for reconstructing a time/frequency tile of an audio object in an audio decoding system, comprising: receiving a downmix signal comprising M channels; receiving at least one encoded element representing a subset of M elements of a row in an upmix matrix, each encoded element comprising a value and a position in the row in the upmix matrix, the position indicating one of the M channels of the downmix signal to which the encoded element corresponds; and reconstructing the time/frequency tile of the audio object from the downmix signal by forming a linear combination of the downmix channels that correspond to the at least one encoded element, wherein in said linear combination each downmix channel is multiplied by the value of its corresponding encoded element.

Thus, according to this method a time/frequency tile of an audio object is reconstructed by forming a linear combination of a subset of the downmix channels. The subset of the downmix channels corresponds to those channels for which encoded upmix coefficients have been received. Thus, the method allows for reconstructing an audio object despite the fact that only a subset, such as a sparse subset, of the upmix matrix is received. By forming a linear combination of only the downmix channels that correspond to the at least one encoded element, the complexity of the decoding process may be decreased. An alternative would be to form a linear combination of all the downmix signals and then multiply some of them (the ones not corresponding to the at least one encoded element) with the value zero.

According to embodiments, the positions of the at least one encoded element vary across a plurality of frequency bands and/or across a plurality of time frames. In other words, different elements of the upmix matrix may be encoded for different time/frequency tiles.

According to embodiments, the number of elements of the at least one encoded element is equal to one. This means that the audio object is reconstructed from one downmix channel in each time/frequency tile. However, the one downmix channel used to reconstruct the audio object may vary between different time/frequency tiles.

According to embodiments, for a plurality of frequency bands or a plurality of time frames, the values of the at least one encoded element form one or more vectors, wherein each value is represented by an entropy coded symbol, wherein each symbol in each vector of entropy coded symbols corresponds to one of the plurality of frequency bands or one of the plurality of time frames, and wherein the one or more vector of entropy coded symbols are decoded using the method according to the second aspect. In this way, the values of the elements of the upmix matrix may be efficiently coded.

According to embodiments, for a plurality of frequency bands or a plurality of time frames, the positions of the at least one encoded element form one or more vectors, wherein each position is represented by an entropy coded symbol, wherein each symbol in each vector of entropy coded symbols corresponds to one of the plurality of frequency bands or the plurality of time frames, and wherein the one or more vector of entropy coded symbols are decoded using the method according to the second aspect. In this way, the positions of the elements of the upmix matrix may be efficiently coded.

According to example embodiments there is provided a computer-readable medium comprising computer code instructions adapted to carry out any method of the third aspect when executed on a device having processing capability.

According to example embodiments there is provided a decoder for reconstructing a time/frequency tile of an audio object, comprising: a receiving component configured to receive a downmix signal comprising M channels and at least one encoded element representing a subset of M elements of a row in an upmix matrix, each encoded element comprising a value and a position in the row in the upmix matrix, the position indicating one of the M channels of the downmix signal to which the encoded element corresponds; and a reconstructing component configured to reconstruct the time/frequency tile of the audio object from the downmix signal by forming a linear combination of the downmix channels that correspond to the at least one encoded element, wherein in said linear combination each downmix channel is multiplied by the value of its corresponding encoded element.

V. Example Embodiments

FIG. 1 shows a generalized block diagram of an audio encoding system 100 for encoding audio objects 104. The audio encoding system comprises a downmixing component 106 which creates a downmix signal 110 from the audio objects 104. The downmix signal 110 may for example be a 5.1 or 7.1 surround signal which is backwards compatible with established sound decoding systems such as Dolby Digital Plus or MPEG standards such as AAC, USAC or MP3. In further embodiments, the downmix signal is not backwards compatible.

To be able to reconstruct the audio objects 104 from the downmix signal 110, upmix parameters are determined at an upmix parameter analysis component 112 from the downmix signal 110 and the audio objects 104. For example the upmix parameters may correspond to elements of an upmix matrix which allows reconstruction of the audio objects 104 from the downmix signal 110. The upmix parameter analysis component 112 processes the downmix signal 110 and the audio objects 104 with respect to individual time/frequency tiles. Thus, the upmix parameters are determined for each time/frequency tile. For example, an upmix matrix may be determined for each time/frequency tile. For example, the upmix parameter analysis component 112 may operate in a frequency domain such as a Quadrature Mirror Filters (QMF) domain which allows frequency-selective processing. For this reason, the downmix signal 110 and the audio objects 104 may be transformed to the frequency domain by subjecting the downmix signal 110 and the audio objects 104 to a filter bank 108. This may for example be done by applying a QMF transform or any other suitable transform.

The upmix parameters 114 may be organized in a vector format. A vector may represent an upmix parameter for reconstructing a specific audio object from the audio objects 104 at different frequency bands at a specific time frame. For example, a vector may correspond to a certain matrix element in the upmix matrix, wherein the vector comprises the values of the certain matrix element for subsequent frequency bands. In further embodiments, the vector may represent upmix parameters for reconstructing a specific audio object from the audio objects 104 at different time frames at a specific frequency band. For example, a vector may correspond to a certain matrix element in the upmix matrix, wherein the vector comprises the values of the certain matrix element for subsequent time frames but at the same frequency band.

Each parameter in the vector corresponds to a non-periodic quantity, for example a quantity which take a value between −9.6 and 9.4. By a non-periodic quantity is generally meant a quantity where there is no periodicity in the values that the quantity may take. This is in contrast to a periodic quantity, such as an angle, where there is a clear periodic correspondence between the values that the quantity may take. For example, for an angle, there is a periodicity of $2\pi$ such that e.g. the angle zero corresponds to the angle $2\pi$.

The upmix parameters 114 are then received by an upmix matrix encoder 102 in the vector format. The upmix matrix encoder will now be explained in detail in conjunction with FIG. 2. The vector is received by a receiving component 202 and has a first element and at least one second element. The number of elements depends on for example the number of frequency bands in the audio signal. The number of elements may also depend on the number of time frames of the audio signal being encoded in one encoding operation.

The vector is then indexed by an indexing component 204. The indexing component is adapted to represent each parameter in the vector by an index value which may take a predefined number of values. This representation can be done in two steps. First the parameter is quantized, and then the quantized value is indexed by an index value. By way of example, in the case where each parameter in the vector can take a value between −9.6 and 9.4, this can be done by using quantization steps of 0.2. The quantized values may then be indexed by indices 0-95, i.e. 96 different values. In the following examples, the index value is in the range of 0-95, but this is of course only an example, other ranges of index values are equally possible, for example 0-191 or 0-63. Smaller quantization steps may yield a less distorted decoded audio signal on a decoder side, but may also yield a larger required bit rate for the transmission of data between the audio encoding system 100 and the decoder.

The indexed values are subsequently sent to an associating component 206 which associates each of the at least one second element with a symbol using a modulo differential encoding strategy. The associating component 206 is adapted to calculate a difference between the index value of the second element and the index value of the preceding element in the vector. By just using a conventional differential encoding strategy, the difference may be anywhere in the range of −95 to 95, i.e. it has 191 possible values. This means that when the difference is encoded using entropy coding, a probability table comprising 191 probabilities is needed, i.e. one probability for each of the 191 possible values of the differences. Moreover, the efficiency of the encoding would be decreased since for each difference, approximately half of the 191 probabilities are impossible. For example, if the second element to be differential encoded has the index value 90, the possible differences are in the range −5 to +90. Typically, having an entropy encoding strategy where some of the probabilities are impossible for each value to be coded will decrease the efficiency of the encoding. The differential encoding strategy in this disclosure may overcome this problem and at the same time reduce the number of needed codes to 96 by applying a modulo 96 operation to the difference. The associating algorithm may thus be expressed as:

$$\Delta_{idx}(b)=(idx(b)-idx(b-1)) \bmod N_Q \quad \text{(Equation 1)}$$

where b is the element in the vector being differential encoded, $N_Q$ is the number of the possible index values, and $\Delta_{idx}(b)$ is the symbol associated with element b.

According to some embodiments, the probability table is translated to a Huffman codebook. In this case, the symbol associated with an element in the vector is used as a codebook index. The encoding component 208 may then encode each of the at least one second element by representing the second element with a codeword in the Huffman codebook that is indexed by the codebook index associated with the second element.

Any other suitable entropy encoding strategy may be implemented in the encoding component 208. By way of example, such encoding strategy may be a range coding strategy or an arithmetic coding strategy.

In the following it is shown that the entropy of the modulo approach is always lower than or equal to the entropy of the conventional differential approach. The entropy, $E_p$, of the conventional differential approach is:

$$E_p=\Sigma_{n=-N_Q+1}^{N_Q-1}(p(n)\log_2 p(n)) \quad \text{(Equation 2)}$$

where p(n)p(n) is the probability of the plain differential index value n.

The entropy, $E_q$ of the modulo approach is:

$$E_q=\Sigma_{n=0}^{N_Q-1}(q(n)\log_2 q(n)) \quad \text{(Equation 3)}$$

where q(n) is the probability of the modulo differential index value n as given by:

$$q(0)=p(0) \quad \text{(Equation 4)}$$

$$q(n)=p(n)+p(n-N_Q) \text{ for } n=1 \ldots N_Q-1 \quad \text{(Equation 5)}$$

We thus have that $$-E_p=p(0)\log_2 p(0)\Sigma_{n=1}^{N_Q-1}(p(n)\log_2 p(n)+\Sigma_{n=-N_Q+1}^{-1}(p(n)\log_2 p(n)) \quad \text{(Equation 6)}$$

Substituting $n=j-N_Q$ in the last summation yields $$-E_p=p(0)\log_2 p(0)\Sigma_{n=1}^{N_Q-1}(p(n)\log_2 p(n)+\Sigma_{j=1}^{N_Q-1}(p(j-N_Q)\log_2 p(j-N_Q)) \quad \text{(Equation 7)}$$

Further, $$-E_p=p(0)\log_2 p(0)\Sigma_{n=1}^{N_Q-1}(p(n)\log_2(p(n)+p(n-N_Q))+\Sigma_{n=1}^{N_Q-1}(p(n-N_Q)\log_2(p(n)+p(n-N_Q))) \quad \text{(Equation 8)}$$

Comparing the sums term by term, since $$\log_2 p(n)\leq\log_2(p(n)+p(n-N_Q)) \quad \text{(Equation 9)}$$

and similarly $$\log_2 p(n-N_Q)\leq\log_2(p(n)+p(n-N_Q)) \quad \text{(Equation 10)}$$

we have that $E_p \geq E_q$.

As shown above, the entropy for the modulo approach is always lower than or equal to the entropy of the conventional differential approach. The case where the entropy is equal is a rare case where the data to be encoded is a pathological data, i.e. non well behaved data, which in most cases does not apply to for example an upmix matrix.

Since the entropy for the modulo approach is always lower than or equal to the entropy of the conventional differential approach, entropy coding of the symbols calculated by the modulo approach will yield in a lower or at least the same bit rate compared to entropy coding of symbols calculated by the conventional differential approach. In other words, the entropy coding of the symbols calculated by the modulo approach is in most cases more efficient than the entropy coding of symbols calculated by the conventional differential approach.

A further advantage is, as mentioned above, that the number of required probabilities in the probability table in the modulo approach are approximately half the number required probabilities in the conventional non-modulo approach.

The above has described a modulo approach for encoding the at least one second element in the vector of parameters. The first element may be encoded by using the indexed value by which the first element is represented. Since the probability distribution of the index value of the first element and the modulo differential value of the at least one second element may be very different, (see FIG. 3 for a probability distribution of the indexed first element and FIG. 4 for a probability distribution of the modulo differential value, i.e. the symbol, for the at least one second element) a dedicated probability table for the first element may be needed. This requires that both the audio encoding system 100 and a corresponding decoder have such a dedicated probability table in its memory.

However, the inventors have observed that the shape of the probability distributions may in some cases be quite similar, albeit shifted relative to one another. This observation may be used to approximate the probability distribution of the indexed first element by a shifted version of the probability distribution of the symbol for the at least one second element. Such shifting may be implemented by adapting the associating component 206 to associate the first element in the vector with a symbol by shifting the index value representing the first element in the vector by an off-set value and subsequently apply modulo 96 (or corresponding value) to the shifted index value.

The calculation of the symbol associated with the first element may thus be expressed as:

$$idx_{shifted}(1)=(idx(1)-\text{abs\_offset})\bmod N_Q \quad \text{(Equation 11)}$$

Figure 3:
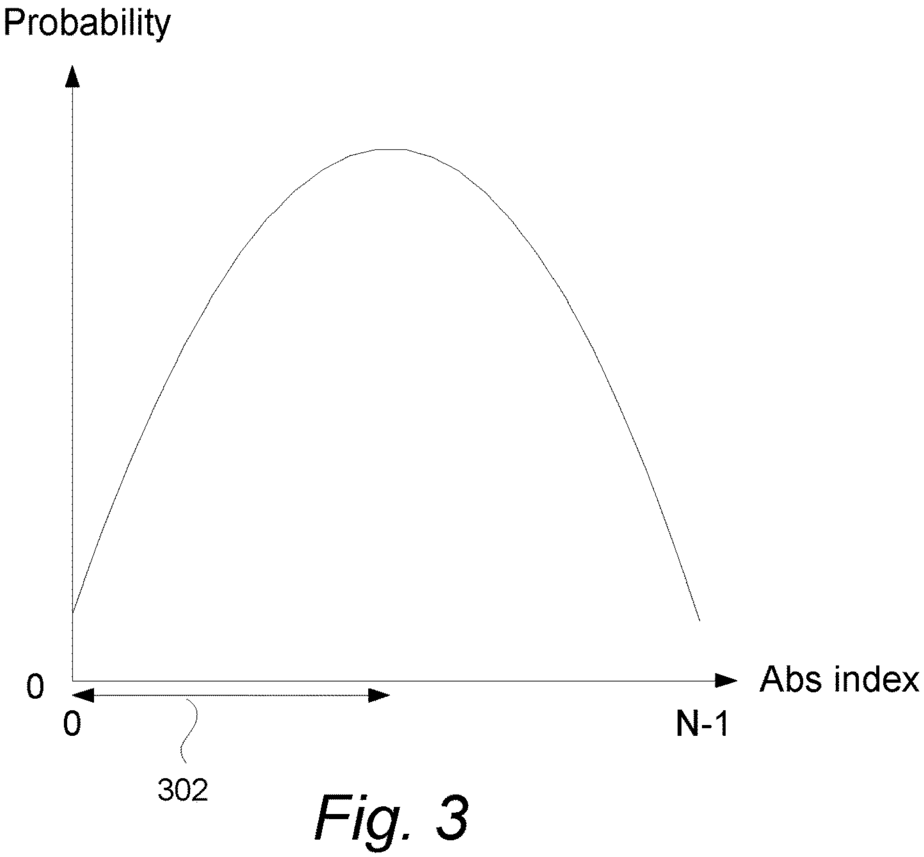
FIG. 3 shows an exemplary probability distribution for a first element in a vector of parameters corresponding to an element in an upmix matrix determined by the audio encoding system of FIG. 1.
Figure 4:
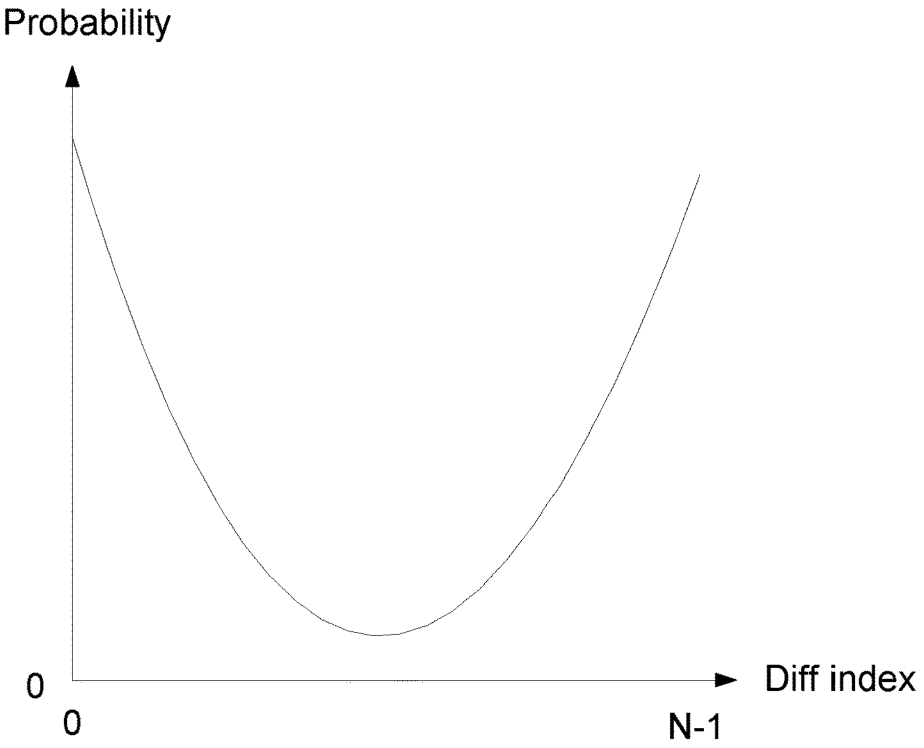
FIG. 4 shows an exemplary probability distribution for an at least one modulo differential coded second element in a vector of parameters corresponding to an element in an upmix matrix determined by the audio encoding system of FIG. 1.

The thus achieved symbol is used by the encoding component 208 which encodes the first element by entropy coding of the symbol associated with the first element using the same probability table that is used to encode the at least one second element. The off-set value may be equal to, or at least close to, the difference between a most probable index value for the first element and the most probable symbol for the at least one second element in the probability table. In FIG. 3, the most probable index value for the first element is denoted by the arrow 302. Assuming that the most probable symbol for the at least one second element is zero, the value denoted by the arrow 302 will be the off-set value used. By using the off-set approach, the peaks of the distributions in FIGS. 3 and 4 are aligned. This approach avoids the need for a dedicated probability table for the first element and hence saves memory at the audio encoding system 100 and the corresponding decoder, while is often maintaining almost the same coding efficiency as a dedicated probability table would provide.

In the case the entropy coding of the at least one second element is done using a Huffman codebook, the encoding component 208 may encode the first element in the vector using the same Huffman codebook that is used to encode the at least one second element by representing the first element with a codeword in the Huffman codebook that is indexed by the codebook index associated with the first element.

Since the look up speed may be important when encoding a parameter in an audio decoding system, the memory on which the codebook is stored is advantageously a fast memory, and thus expensive. By just using one probability table, the encoder may thus be cheaper than in the case where two probability tables are used.

It may be noted that the probability distributions shown in FIG. 3 and FIG. 4 often is calculated over a training dataset beforehand and thus not calculated while encoding the vector, but it is of course possible to calculate the distributions "on the fly" while encoding.

It may also be noted that the above description of an audio encoding system 100 using a vector from an upmix matrix as the vector of parameters being encoded is just an example application. The method for encoding a vector of parameters, according to this disclosure, may be used in other applications in an audio encoding system, for example when encoding other internal parameters in downmix encoding system such as parameters used in a parametric bandwidth extension system such as spectral band replication (SBR).

Figure 5:
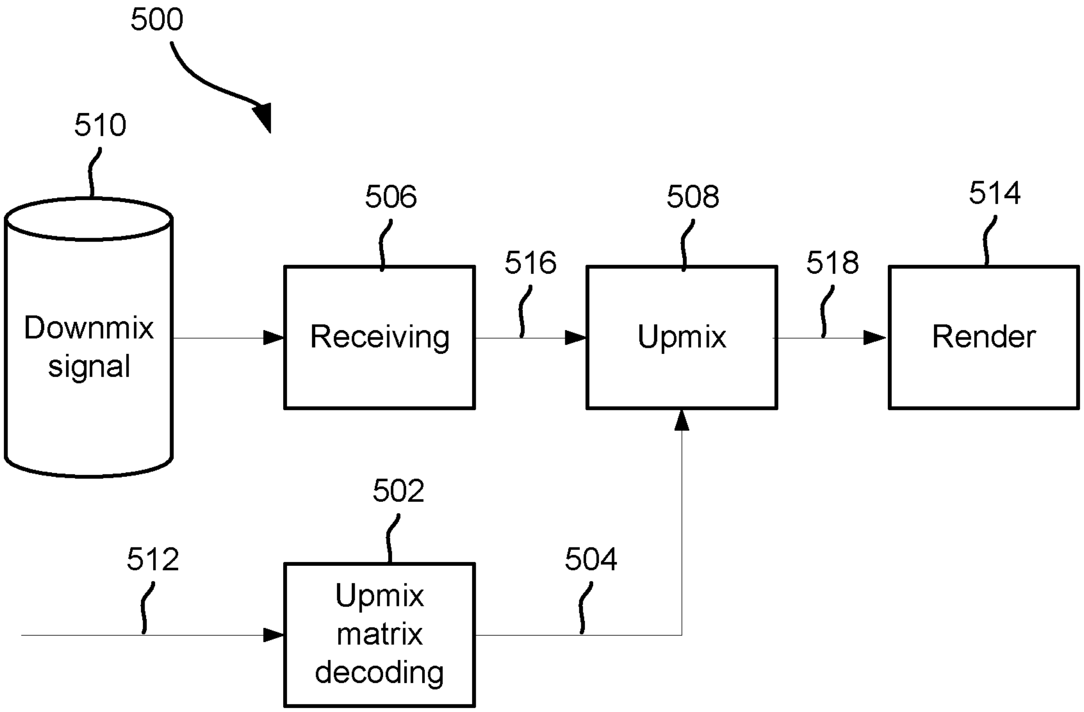
FIG. 5 is a generalized block diagram of an audio decoding system in accordance with an example embodiment.

FIG. 5 is a generalized block diagram of an audio decoding system 500 for recreating encoded audio objects from a coded downmix signal 510 and a coded upmix matrix 512. The coded downmix signal 510 is received by a downmix receiving component 506 where the signal is decoded and, if not already in a suitable frequency domain, transformed to a suitable frequency domain. The decoded downmix signal 516 is then sent to the upmix component 508. In the upmix component 508, the encoded audio objects are recreated using the decoded downmix signal 516 and a decoded upmix matrix 504. More specifically, the upmix component 508 may perform a matrix operation in which the decoded upmix matrix 504 is multiplied by a vector comprising the decoded downmix signals 516. The decoding process of the upmix matrix is described below. The audio decoding system 500 further comprises a rendering component 514 which output an audio signal based on the reconstructed audio objects 518 depending on what type of playback unit that is connected to the audio decoding system 500.

Figure 6:
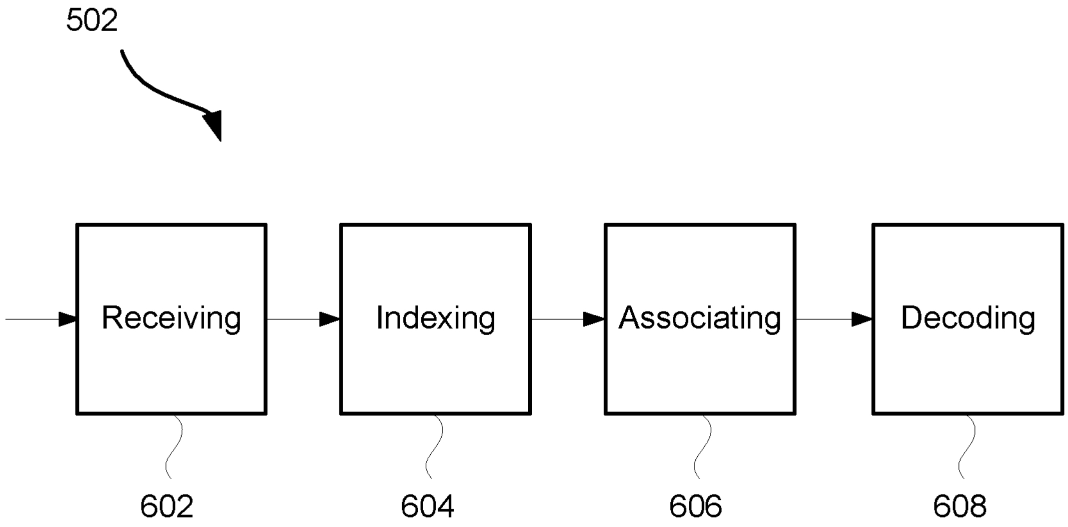
FIG. 6 is a generalized block diagram of a upmix matrix decoder shown in FIG. 5.

A coded upmix matrix 512 is received by an upmix matrix decoder 502 which will now be explained in detail in conjunction with FIG. 6. The upmix matrix decoder 502 is configured to decode a vector of entropy coded symbols in an audio decoding system into a vector of parameters relating to a non-periodic quantity. The vector of entropy coded symbols comprises a first entropy coded symbol and at least one second entropy coded symbol and the vector of parameters comprises a first element and at least a second element. The coded upmix matrix 512 is thus received by a receiving component 602 in a vector format. The decoder 502 further comprises an indexing component 604 configured to represent each entropy coded symbol in the vector by a symbol which may take N values by using a probability table. N may for example be 96. An associating component 606 is configured to associate the first entropy coded symbol with an index value by any suitable means, depending on the encoding method used for encoding the first element in the vector of parameters. The symbol for each of the second codes and the index value for the first code is then used by the associating component 606 which associates each of the at least one second entropy coded symbol with an index value. The index value of the at least one second entropy coded symbol is calculated by first calculating the sum of the index value associated with the entropy coded symbol preceding the second entropy coded symbol in the vector of entropy coded symbols and the symbol representing the second entropy coded symbol. Subsequently, modulo N is the applied to the sum. Assuming, without loss of generality, that the minimum index value is 0 and the maximum index value is N−1, e.g. 95. The associating algorithm may thus be expressed as:

$$idx(b)=(idx(b-1)+\Delta_{idx}(b))\bmod N_Q \quad \text{(Equation 12)}$$

where b is the element in the vector being decoded and $N_Q$N is the number of the possible index values.

The upmix matrix decoder 502 further comprises a decoding component 608 which is configured to represent the at least one second element of the vector of parameters by a parameter value corresponding to the index value associated with the at least one second entropy coded symbol. This representation is thus the decoded version of the parameter encoded by for example the audio encoding system 100 shown in FIG. 1. In other words, this representation is equal to the quantized parameter encoded by the audio encoding system 100 shown in FIG. 1.

According to one embodiment of the present invention, each entropy coded symbol in the vector of entropy coded symbol is represented by symbol using the same probability table for all entropy coded symbols in the vector of entropy coded symbols. An advantage of this is that only one probability table needs to be stored in the memory of the decoder. Since the look up speed may be important when decoding entropy coded symbol in an audio decoding system, the memory on which the probability table is stored is advantageously a fast memory, and thus expensive. By just using one probability table, the decoder may thus be cheaper than in the case where two probability tables are used. According to this embodiment, the association component 606 may be configured to associating the first entropy coded symbol with an index value by first shifting the symbol representing the first entropy coded symbol in the vector of entropy coded symbols by an off-set value. Modulo N is then applied to the shifted symbol. The associating algorithm may thus be expressed as:

$$idx(1)=(idx_{shifted}(1)+\text{abs\_offset}) \bmod N_Q \quad \text{(Equation 13)}$$

The decoding component 608 is configured to represent the first element of the vector of parameters by a parameter value corresponding to the index value associated with the first entropy coded symbol. This representation is thus the decoded version of the parameter encoded by for example the audio encoding system 100 shown in FIG. 1.

The method of differential encoding a non-periodic quantity will now be further explained in conjunction with FIGS. 7-10.

Figure 7:
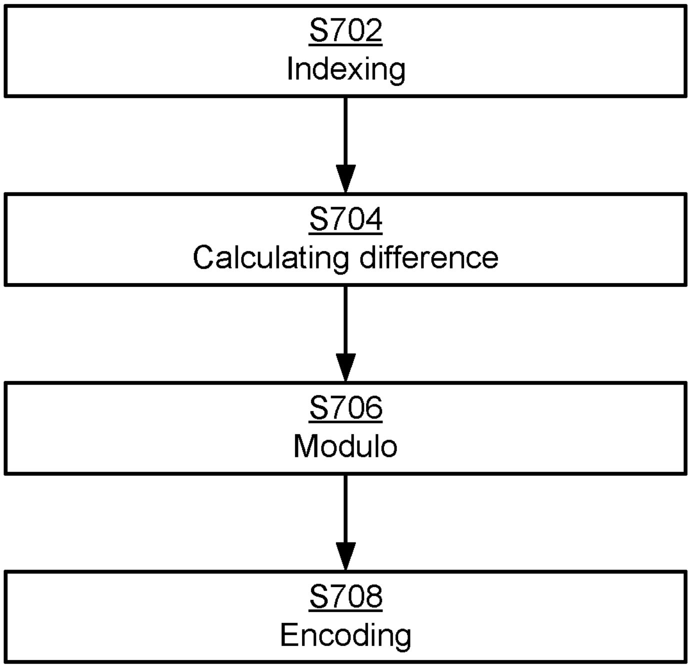
FIG. 7 describes an encoding method for the second elements in a vector of parameters corresponding to an element in an upmix matrix determined by the audio encoding system of FIG. 1.
Figure 9:
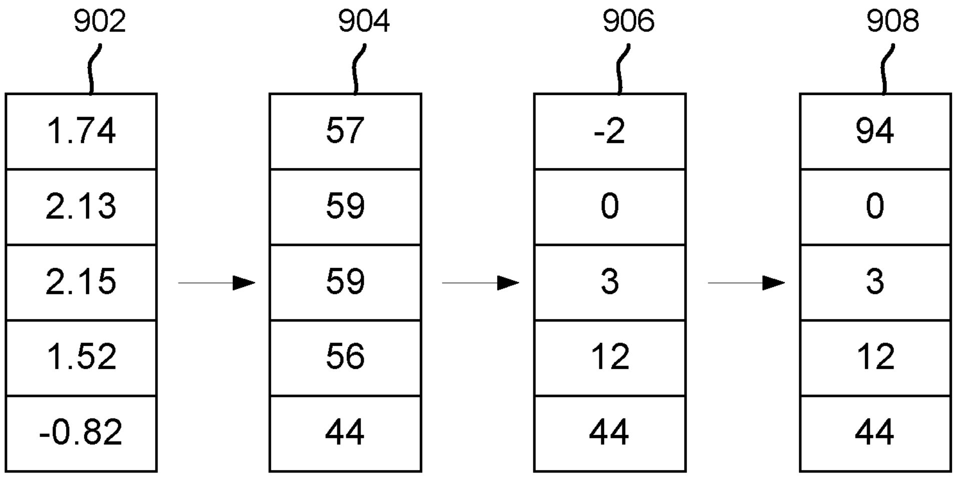
FIG. 9 describes the parts of the encoding method of FIG. 7 for the second elements in an exemplary vector of parameters.

FIGS. 7 and 9 describe an encoding method for four (4) second elements in a vector of parameters. The input vector 902 thus comprises five parameters. The parameters may take any value between a min value and a max value. In this example, the min value is −9.6 and the max value is 9.4. The first step S702 in the encoding method is to represent each parameter in the vector 902 by an index value which may take N values. In this case, N is chosen to be 96, which means that the quantization step size is 0.2. This gives the vector 904. The next step S704 is to calculate the difference between each of the second elements, i.e. the four upper parameters in vector 904, and its preceding element. The resulting vector 906 thus comprises four differential values—the four upper values in the vector 906. As can be seen in FIG. 9, the differential values may be both negative, zero and positive. As explained above, it is advantageous to have differential values which only can take N values, in this case 96 values. To achieve this, in the next step S706 of this method, modulo 96 is applied to the second elements in the vector 906. The resulting vector 908 does not contain any negative values. The thus achieved symbol shown in vector 908 is then used for encoding the second elements of the vector in the final step S708 of the method shown in FIG. 7 by entropy coding of the symbol associated with the at least one second element based on a probability table comprising probabilities of the symbols shown in vector 908.

Figure 8:
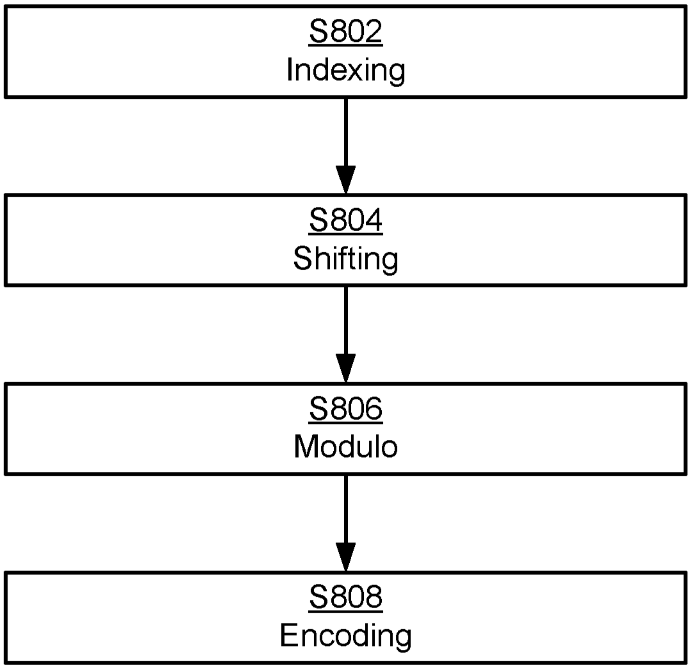
FIG. 8 describes an encoding method for a first element in a vector of parameters corresponding to an element in an upmix matrix determined by the audio encoding system of FIG. 1.
Figure 10:
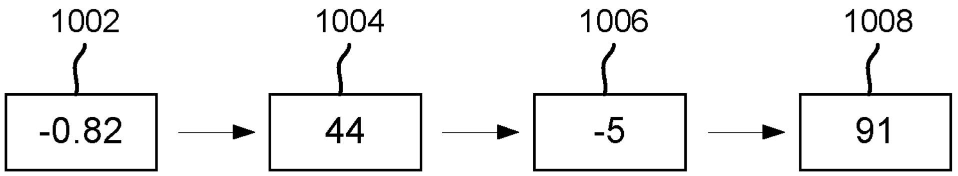
FIG. 10 describes the parts of the encoding method of FIG. 8 for the first element in an exemplary vector of parameters.

As seen in FIG. 9, the first element is not handled after the indexing step S702. In FIGS. 8 and 10, a method for encoding the first element in the input vector is described. The same assumption as made in the above description of FIGS. 7 and 9 regarding the min and max value of the parameters and the number of possible index values are valid when describing FIGS. 8 and 10. The first element 1002 is received by the encoder. In the first step S802 of the encoding method, the parameter of the first element is represented by an index value 1004. In the next step S804, the indexed value 1004 is shifted by an off-set value. In this example, the value of the off-set is 49. This value is calculated as described above. In the next step S806, modulo 96 is applied to the shifted index value 1006. The resulting value 1008 may then be used in an encoding step S802 to encode the first element by entropy coding of the symbol 1008 using the same probability table that is used to encode the at least one second element in FIG. 7.

Figure 11:
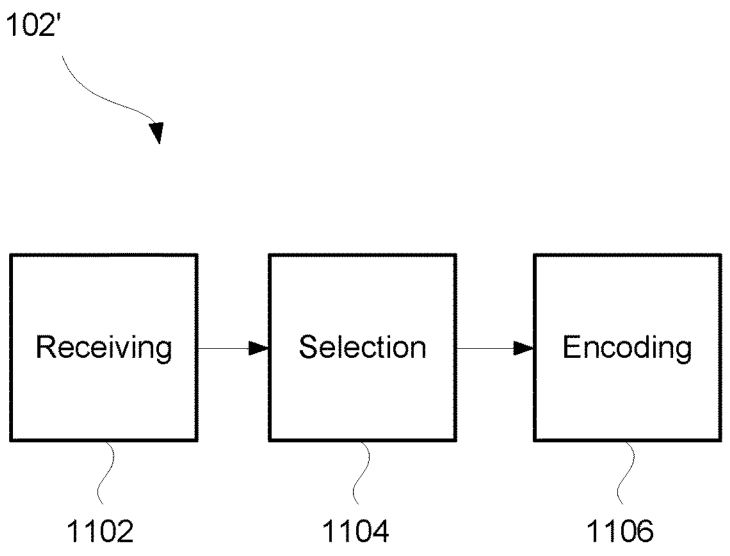
FIG. 11 is a generalized block diagram of an second exemplary upmix matrix encoder shown in FIG. 1.

FIG. 11 shows an embodiment 102' of the upmix matrix encoding component 102 in FIG. 1. The upmix matrix encoder 102' may be used for encoding an upmix matrix in an audio encoding system, for example the audio encoding system 100 shown in FIG. 1. As described above, each row of the upmix matrix comprises M elements allowing reconstruction of an audio object from a downmix signal comprising M channels.

At low overall target bitrates, encoding and sending all M upmix matrix elements per object and T/F tile, one for each downmix channel, can require an undesirably high bit rate. This can be reduced by "sparsening" of the upmix matrix, i.e., trying to reduce the number of non-zero elements. In some cases, four out of five elements are zero and only a single downmix channel is used as basis for reconstruction of the audio object. Sparse matrices have other probability distributions of the coded indices (absolute or differential) than non-sparse matrices. In cases where the upmix matrix comprises a large portion of zeros, such that the value zero becomes more probable than 0.5, and Huffman coding is used, the coding efficiency will decrease since the Huffman coding algorithm is inefficient when a specific value, e.g. zero, has a probability of more than 0.5. Moreover, since many of the elements in the upmix matrix have the value zero, they do not contain any information. A strategy may thus be to select a subset of the upmix matrix elements and only encode and transmit those to a decoder. This may decrease the required bit rate of an audio encoding/decoding system since less data is transmitted.

To increase the efficiency of the coding of the upmix matrix, a dedicated coding mode for sparse matrices may be used which will be explained in detail below.

The encoder 102' comprises a receiving component 1102 adapted to receive each row in the upmix matrix. The encoder 102' further comprises a selection component 1104 adapted to select a subset of elements from the M elements of the row in the upmix matrix. In most cases, the subset comprises all elements not having a zero value. But according to some embodiment, the selection component may choose to not select an element having a non-zero value, for example an element having a value close to zero. According to embodiments, the selected subset of elements may comprise the same number of elements for each row of the upmix matrix. To further reduce the required bit rate, the number of selected elements may be one (1).

The encoder 102' further comprises an encoding component 1106 which is adapted to represent each element in the selected subset of elements by a value and a position in the upmix matrix. The encoding component 1106 is further adapted to encode the value and the position in the upmix matrix of each element in the selected subset of elements. It may for example be adapted to encode the value using modulo differential encoding as described above. In this case, for each row in the upmix matrix and for a plurality of frequency bands or a plurality of time frames, the values of the elements of the selected subsets of elements form one or more vector of parameters. Each parameter in the vector of parameters corresponds to one of the plurality of frequency bands or the plurality of time frames. The vector of parameters may thus be coded using modulo differential encoding as described above. In further embodiments, the vector of parameters may be coded using regular differential encoding. In yet another embodiment, the encoding component 1106 is adapted to code each value separately, using fixed rate coding of the true quantization value, i.e. not differential encoded, of each value.

The below examples of average bit rates have been observed for typically content. The bit rates have been measured for the case where M=5, the number of audio objects to be reconstructed on a decoder side is 11, the number of frequency bands are 12 and the step size of the parameter quantizer is 0.1 and has 192 levels. For the case where all five elements per row in the upmix matrix have been encoded, the following average bit rates have been observed:

Fixed rate coding: 165 kb/sec,

Differential coding: 51 kb/sec,

Modulo differential coding: 51 kb/sec, but with half the size of the probability table or codebook as described above.

For the case where only one element is chosen for each row in the upmix matrix, i.e. sparse encoding, by the selection component 1104, the following average bit rates have been observed.

Fixed rate coding (using 8 bits for the value and 3 bits for the position): 45 kb/sec, Modulo differential coding for both the value of the element and the position of the element: 20 kb/sec.

The encoding component 1106 may be adapted to encode the position in the upmix matrix of each element in the subset of elements in the same way as the value. The encoding component 1106 may also be adapted to encode the position in the upmix matrix of each element in the subset of elements in a different way compared to the encoding of the value. In the case of coding the position using differential coding or modulo differential coding, for each row in the upmix matrix and for a plurality of frequency bands or a plurality of time frames, the positions of the elements of the selected subsets of elements form one or more vector of parameters. Each parameter in the vector of parameters corresponds to one of the plurality of frequency bands or plurality of time frame. The vector of parameters is thus encoded using differential coding or modulo differential coding as described above.

Figure 2:
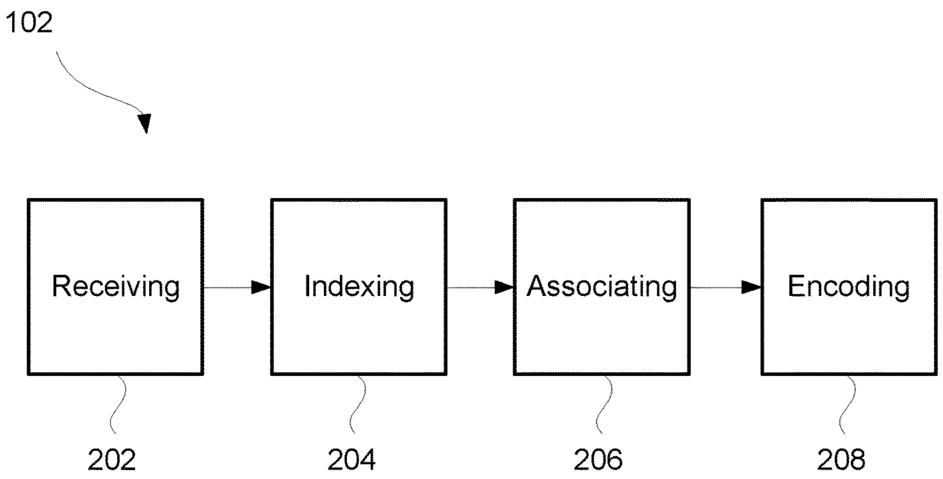
FIG. 2 is a generalized block diagram of an exemplary upmix matrix encoder shown in FIG. 1.

It may be noted that the encoder 102' may be combined with the encoder 102 in FIG. 2 to achieve modulo differential coding of a sparse upmix matrix according to the above.

It may further be noted that the method of encoding a row in a sparse matrix has been exemplified above for encoding a row in a sparse upmix matrix, but the method may be used for coding other types of sparse matrices well known to the person skilled in the art.

Figure 13:
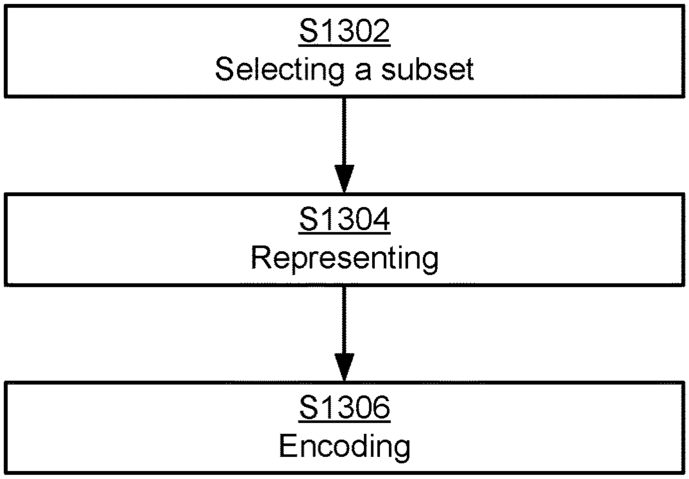
FIG. 13 describes an encoding method for sparse encoding of a row of an upmix matrix.
Figure 14:
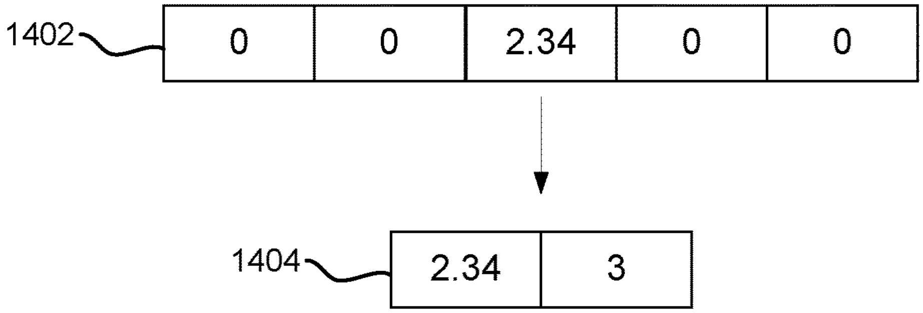
FIG. 14 describes parts of the encoding method of FIG. 10 for an exemplary row of an upmix matrix.
Figure 15:
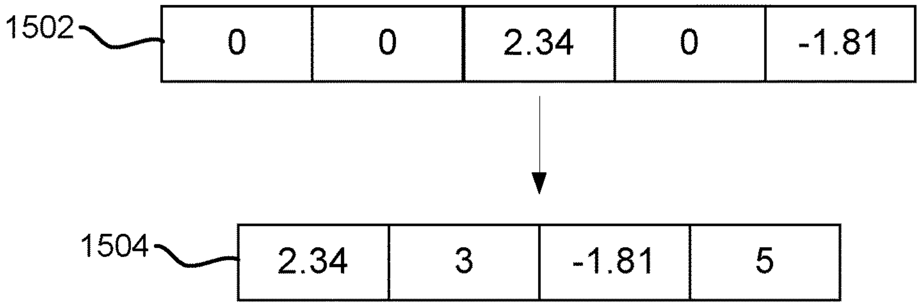
FIG. 15 describes parts of the encoding method of FIG. 10 for an exemplary row of an upmix matrix.

The method for encoding a sparse upmix matrix will now be further explained in conjunction with FIGS. 13-15.

An upmix matrix is received, for example by the receiving component 1102 in FIG. 11. For each row 1402, 1502 in the upmix matrix, the method comprising selecting a subset S1302 from the M, e.g. 5, elements of the row in the upmix matrix. Each element in the selected subset of elements is then represented S1304 by a value and a position in the upmix matrix. In FIG. 14, one element is selected S1302 as the subset, e.g. element number 3 having a value of 2.34. The representation may thus be a vector 1404 having two fields. The first field in the vector 1404 represents the value, e.g. 2.34, and the second field in the vector 1404 represents the position, e.g. 3. In FIG. 15, two elements are selected S1302 as the subset, e.g. element number 3 having a value of 2.34 and element number 5 having a value of −1.81. The representation may thus be a vector 1504 having four fields. The first field in the vector 1504 represents the value of the first element, e.g. 2.34, and the second field in the vector 1504 represents the position of the first element, e.g. 3. The third field in the vector 1504 represents the value of the second element, e.g. −1.81, and the fourth field in the vector 1504 represents the position of the second element, e.g. 5. The representations 1404, 1504 is then encoded S1306 according to the above.

Figure 12:
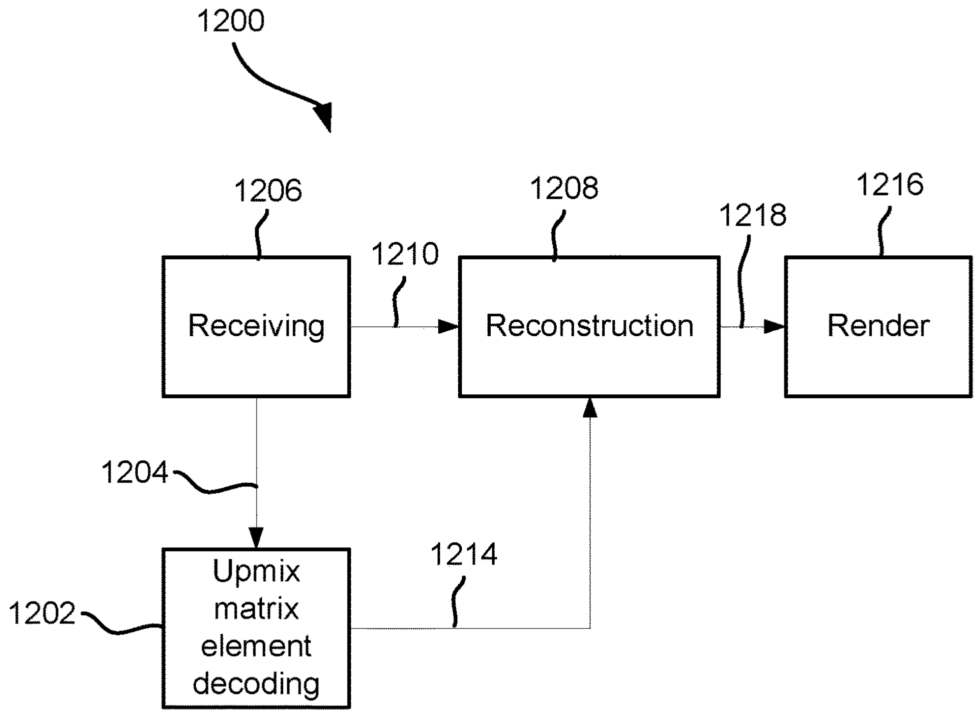
FIG. 12 is a generalized block diagram of an audio decoding system in accordance with an example embodiment.

FIG. 12 is a generalized block diagram of an audio decoding system 1200 in accordance with an example embodiment. The decoder 1200 comprises a receiving component 1206 configured to receive a downmix signal 1210 comprising M channels and at least one encoded element 1204 representing a subset of M elements of a row in an upmix matrix. Each of the encoded elements comprises a value and a position in the row in the upmix matrix, the position indicating one of the M channels of the downmix signal 1210 to which the encoded element corresponds. The at least one encoded element 1204 is decoded by an upmix matrix element decoding component 1202. The upmix matrix element decoding component 1202 is configured to decode the at least one encoded element 1204 according to the encoding strategy used for encoding the at least one encoded element 1204. Examples on such encoding strategies are disclosed above. The at least one decoded element 1214 is then sent to the reconstructing component 1208 which is configured to reconstruct a time/frequency tile of the audio object from the downmix signal 1210 by forming a linear combination of the downmix channels that correspond to the at least one encoded element 1204. When forming the linear combination each downmix channel is multiplied by the value of its corresponding encoded element 1204.

For example, if the decoded element 1214 comprises the value 1.1 and the position 2, the time/frequency tile of the second downmix channel is multiplied by 1.1 and this is then used for reconstructing the audio object.

The audio decoding system 500 further comprises a rendering component 1216 which output an audio signal based on the reconstructed audio object 1218. The type of audio signal depends on what type of playback unit that are connected to the audio decoding system 1200. For example, if a pair of headphones is connected to the audio decoding system 1200, a stereo signal may be outputted by the rendering component 1216.

Equivalents, Extensions, Alternatives and Miscellaneous

Further embodiments of the present disclosure will become apparent to a person skilled in the art after studying the description above. Even though the present description and drawings disclose embodiments and examples, the disclosure is not restricted to these specific examples. Numerous modifications and variations can be made without departing from the scope of the present disclosure, which is defined by the accompanying claims. Any reference signs appearing in the claims are not to be understood as limiting their scope.

Additionally, variations to the disclosed embodiments can be understood and effected by the skilled person in practicing the disclosure, from a study of the drawings, the disclosure, and the appended claims. In the claims, the word “comprising” does not exclude other elements or steps, and the indefinite article “a” or “an” does not exclude a plurality. The mere fact that certain measures are recited in mutually different dependent claims does not indicate that a combination of these measured cannot be used to advantage.

The systems and methods disclosed hereinabove may be implemented as software, firmware, hardware or a combination thereof. In a hardware implementation, the division of tasks between functional units referred to in the above description does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media typically embodies computer readable instructions, data structures, program modules or other data in a modulated data signal such as a carrier wave or other transport mechanism and includes any information delivery media.

The invention claimed is:

1. A method for encoding N audio signals, the method comprising:

receiving the N audio signals;

generating a downmix signal comprising M channels from the N audio signals;

determining N rows in an upmix matrix, each of the N rows in the upmix matrix comprising M elements; and generating an encoded signal from downmix signal and the N rows in the upmix matrix, wherein, for each of the N rows in the upmix matrix, generating the encoded signal comprises:

selecting a subset of elements from the M elements of the row in the upmix matrix;

representing each element in the selected subset of elements by a value and a position in the upmix matrix; and encoding, using entropy coding, the value and the position in the upmix matrix of each element in the selected subset of elements.

2. The method of claim 1, wherein, for each of the N rows in the upmix matrix, the positions in the upmix matrix of the selected subset of elements vary across a plurality of frequency bands and/or across a plurality of time frames.

3. The method of claim 1, wherein the selected subset of elements comprises the same number of elements for each of the N rows of the upmix matrix.

4. The method of claim 1, wherein, for each of the N rows of the upmix matrix, the selected subset of elements comprises exactly one element from the M elements of the row in the upmix matrix.

5. The method of claim 1, wherein, for each of the N rows in the upmix matrix and for a plurality of frequency bands or a plurality of time frames, the values and/or the positions of the elements of the selected subsets of elements form one or more vector of parameters, each parameter in the vector of parameters corresponding to one of the plurality of frequency bands or the plurality of time frames, the vector of parameters having a first element and at least one second element, wherein the method comprises encoding the one or more vectors of parameters by at least:

representing each parameter in the vector by an index value which may take N values;

associating each of the at least one second element with a symbol, the symbol being calculated by:

calculating a difference between the index value of the second element and the index value of its preceding element in the vector;

applying modulo N to the difference;

encoding each of the at least one second element by entropy coding of the symbol associated with the at least one second element based on a probability table comprising probabilities of the symbols.

6. The method of claim 5, wherein encoding the one or more vectors of parameters further includes:

associating the first element in the vector with a symbol, the symbol being calculated by:

shifting the index value representing the first element in the vector by an off-set value;

applying modulo N to the shifted index value;

encoding the first element by entropy coding of the symbol associated with the first element using the same probability table that is used to encode the at least one second element.

7. The method of claim 5, wherein the probability table is translated to a Huffman codebook, wherein the symbol associated with an element in the vector is used as a codebook index, and wherein the step of encoding each of the at least one second element comprises encoding each of the at least one second element by representing the second element with a codeword in the codebook that is indexed by the codebook index associated with the second element.

8. The method of claim 6, wherein the probability table is translated to a Huffman codebook, wherein the symbol associated with an element in the vector is used as a codebook index, wherein the step of encoding each of the at least one second element comprises encoding each of the at least one second element by representing the second element with a codeword in the codebook that is indexed by the codebook index associated with the second element, and wherein the step of encoding the first element comprises encoding the first element in the vector using the same Huffman codebook that is used to encode the at least one second element by representing the first element with a codeword in the Huffman codebook that is indexed by the codebook index associated with the first element.

9. A non-transitory computer-readable storage medium comprising instructions, wherein, when executed by a device, the instructions cause the device to carry out the method of claim 1.

10. The method of claim 1, wherein the entropy coding includes modulo differential coding.

11. The method of claim 1, wherein the entropy coding includes at least one of Huffman coding, range coding, and arithmetic coding.

12. A method for reconstructing N audio signals, the method comprising:

receiving a downmix signal comprising M channels;

determining N rows in an upmix matrix, wherein determining each of the N rows in the upmix matrix comprises receiving at least one encoded element representing a subset of M elements of the row in the upmix matrix, each encoded element being encoded using entropy coding and comprising a value and a position in the row in the upmix matrix, the position indicating one of the M channels of the downmix signal to which the encoded element corresponds; and reconstructing the N audio signals from the downmix signal and the upmix matrix, wherein generating the N audio signals comprises, for each of the N rows in the upmix matrix, forming a linear combination of the downmix channels that correspond to the at least one encoded element, wherein in said linear combination each downmix channel is multiplied by the value of its corresponding encoded element.

13. The method of claim 12, wherein the positions of the at least one encoded element vary across a plurality of frequency bands and/or across a plurality of time frames.

14. The method of claim 12, wherein the number of elements of the at least one encoded element is equal to one.

15. The method of claim 12, wherein, for a plurality of frequency bands or a plurality of time frames, the values of the at least one encoded element form one or more vectors, wherein each value is represented by an entropy coded symbol, wherein each entropy coded symbol in each vector of entropy coded symbols corresponds to one of the plurality of frequency bands or one of the plurality of time frames, wherein the method comprises decoding the one or more vectors of entropy coded symbols into one or more vectors of parameters, wherein each vector of entropy coded symbols comprises a first entropy coded symbol and at least one second entropy coded symbol and wherein each vector of parameters comprises a first element and at least one second element, wherein decoding the one or more vectors of entropy coded symbols includes:

representing each entropy coded symbol in the vector of entropy coded symbols by a symbol which may take N integer values by using a probability table;

associating the first entropy coded symbol with an index value;

associating each of the at least one second entropy coded symbol with an index value, the index value of the at least one second entropy coded symbol being calculated by:

calculating the sum of the index value associated with the of entropy coded symbol preceding the second entropy coded symbol in the vector of entropy coded symbols and the symbol representing the second entropy coded symbol;

applying modulo N to the sum;

representing the at least one second element of the vector of parameters by a parameter value corresponding to the index value associated with the at least one second entropy coded symbol.

16. The method of claim 12, wherein, for a plurality of frequency bands or a plurality of time frames, the positions of the at least one encoded element form one or more vectors, wherein each position is represented by an entropy coded symbol, wherein each entropy coded symbol in each vector of entropy coded symbols corresponds to one of the plurality of frequency bands or one of the plurality of time frames, wherein the method comprises decoding the one or more vectors of entropy coded symbols into one or more vectors of parameters, wherein each vector of entropy coded symbols comprises a first entropy coded symbol and at least one second entropy coded symbol and wherein each vector of parameters comprises a first element and at least one second element, wherein decoding the one or more vectors of entropy coded symbols includes:

representing each entropy coded symbol in the vector of entropy coded symbols by a symbol which may take N integer values by using a probability table;

associating the first entropy coded symbol with an index value;

associating each of the at least one second entropy coded symbol with an index value, the index value of the at least one second entropy coded symbol being calculated by:

calculating the sum of the index value associated with the entropy coded symbol preceding the second entropy coded symbol in the vector of entropy coded symbols and the symbol representing the second entropy coded symbol;

applying modulo N to the sum;

representing the at least one second element of the vector of parameters by a parameter value corresponding to the index value associated with the at least one second entropy coded symbol.

17. The method of claim 15, wherein the step of representing each entropy coded symbol in the vector of entropy coded symbols by a symbol is performed using the same probability table for all entropy coded symbols in the vector of entropy coded symbols, wherein the index value associated with the first entropy coded symbol is calculated by:

shifting the symbol representing the first entropy coded symbol in the vector of entropy coded symbols by an off-set value;

applying modulo N to the shifted symbol;

the method further comprising the step of:

representing the first element of the vector of parameters by a parameter value corresponding to the index value associated with the first entropy coded symbol.

18. The method of claim 16, wherein the step of representing each entropy coded symbol in the vector of entropy coded symbols by a symbol is performed using the same probability table for all entropy coded symbols in the vector of entropy coded symbols, wherein the index value associated with the first entropy coded symbol is calculated by:

shifting the symbol representing the first entropy coded symbol in the vector of entropy coded symbols by an off-set value;

applying modulo N to the shifted symbol;

the method further comprising the step of:

representing the first element of the vector of parameters by a parameter value corresponding to the index value associated with the first entropy coded symbol.

19. A non-transitory computer-readable storage medium comprising instructions, wherein, when executed by a device, the instructions cause the device to carry out the method of claim 12.

20. A decoder for reconstructing N audio signals, the decoder comprising:

a receiving component configured to receive a downmix signal comprising M channels;

a matrix decoding component configured to determine N rows in an upmix matrix, wherein determining each of the N rows in the upmix matrix comprises receiving at least one encoded element representing a subset of M elements of the row in the upmix matrix, each encoded element being encoded using entropy coding and comprising a value and a position in the row in the upmix matrix, the position indicating one of the M channels of the downmix signal to which the encoded element corresponds; and a reconstructing component configured to reconstruct the N audio signals from the downmix signal and the upmix matrix, wherein generating the N audio signals comprises, for each of the N rows in the upmix matrix, forming a linear combination of the downmix channels that correspond to the at least one encoded element, wherein in said linear combination each downmix channel is multiplied by the value of its corresponding encoded element.

* * * * *